United States Patent [19]

Bisson et al.

[11] 3,960,255

[45] June 1, 1976

[54] MOUNTING MECHANISM FOR A NON-IMPACT DOTS-MATRIX PRINT HEAD

[75] Inventors: Flavio Bisson, Montalto Dora (Turin); Armando Aprato, Lugnacco (Turin), both of Italy

[73] Assignee: Ing. C. Olivetti & C., S.p.A., Ivrea (Turin), Italy

[22] Filed: Dec. 10, 1974

[21] Appl. No.: 531,256

[30] Foreign Application Priority Data

May 10, 1974 Italy ................................ 68469/74

[52] U.S. Cl. ................................ 197/1 R; 346/76 R

[51] Int. Cl.² ........................................ G01D 15/10

[58] Field of Search ............... 197/1 R, 52; 219/216; 339/91 R; 346/76 R

[56] References Cited

UNITED STATES PATENTS

| | | | |
|---|---|---|---|
| 1,899,360 | 2/1933 | Roudebush | 339/91 R |
| 2,518,464 | 8/1950 | Guillemin | 339/91 R |
| 2,811,700 | 10/1957 | Kuch | 339/91 R X |
| 3,149,897 | 9/1964 | Martineck | 339/91 R X |
| 3,278,714 | 10/1966 | Bernutz | 339/91 R X |
| 3,855,448 | 12/1974 | Hanagata | 346/76 R X |
| 3,871,733 | 3/1975 | Praeger | 339/91 R |

FOREIGN PATENTS OR APPLICATIONS

| | | | |
|---|---|---|---|
| 922,776 | 2/1947 | France | 339/91 R |

*Primary Examiner*—Harland S. Skogquist
*Attorney, Agent, or Firm*—I. J. Schaefer

[57] ABSTRACT

An improved mounting mechanism for a non-impact dot matrix printing head comprising a guide for positioning the support carrying the head on a base member, a resiliently actuated mechanism for removably fixing said head to said base member, and a manually operable device for activating the mechanism to remove the support from the base member.

6 Claims, 5 Drawing Figures

FIG. 1

MOUNTING MECHANISM FOR A NON-IMPACT DOTS-MATRIX PRINT HEAD

BACKGROUND OF THE INVENTION

1. Field of the Invention:

The present invention relates to a non-impact print head and more particularly to a dot-matrix thermal head having means associated therewith for releasably mounting it to an operating device.

There is shown in U.S. Pat. application Ser. No. 512,564 assigned to the assignee of the subject patent application a thermal print head carrying on an insulating support a plurality of resistive printing elements aligned along a rectilinear line.

The head is positioned onto a carriage with the line of the resistive elements transverse to the printing line of the recording medium and the carriage moves the head along the printing line for writing dot-matrix characters at a rate of a matrix column at a time.

SUMMARY OF THE INVENTION

The object of the present invention is to provide an improved mechanism for releasably connecting a thermal print head of the type disclosed in the above mentioned patent application to the means for driving the head during the printing operations.

This and other objects of the present invention will be pointed out in the following description and in the claims and illustrated in the accompanying drawings.

DESCRIPTION OF THE PREFERRED EMBODIMENTS

Figure 1:
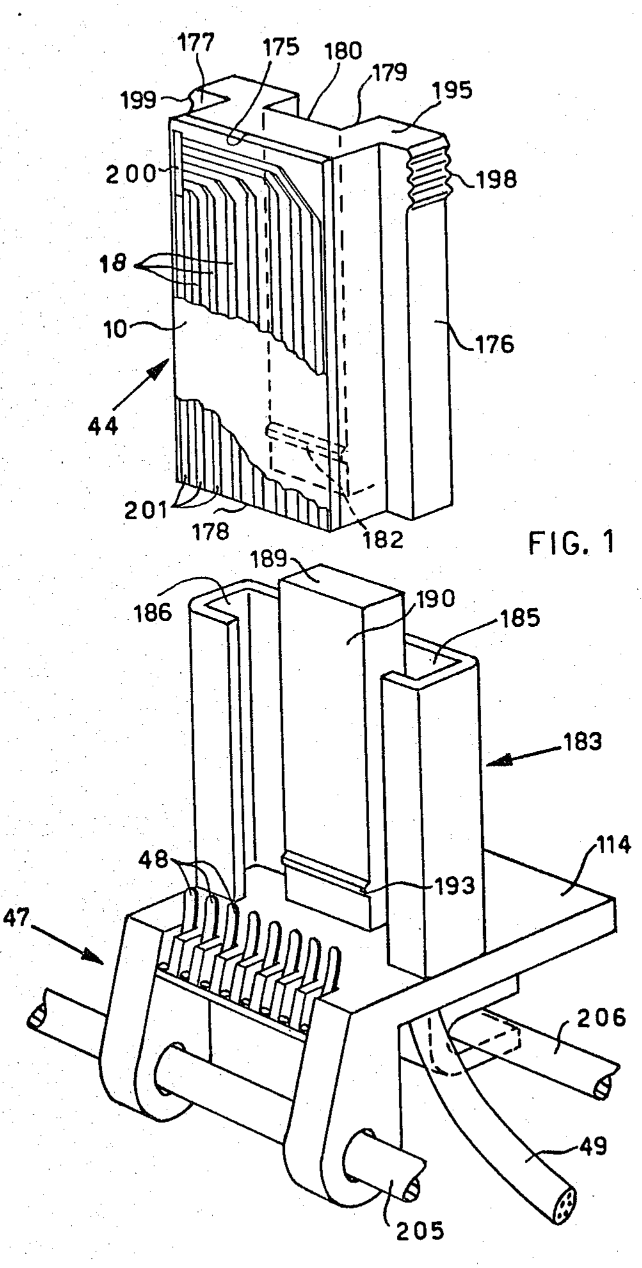
FIG. 1 is a perspective view of a first embodiment of the mechanism according to the invention.
Figure 2:
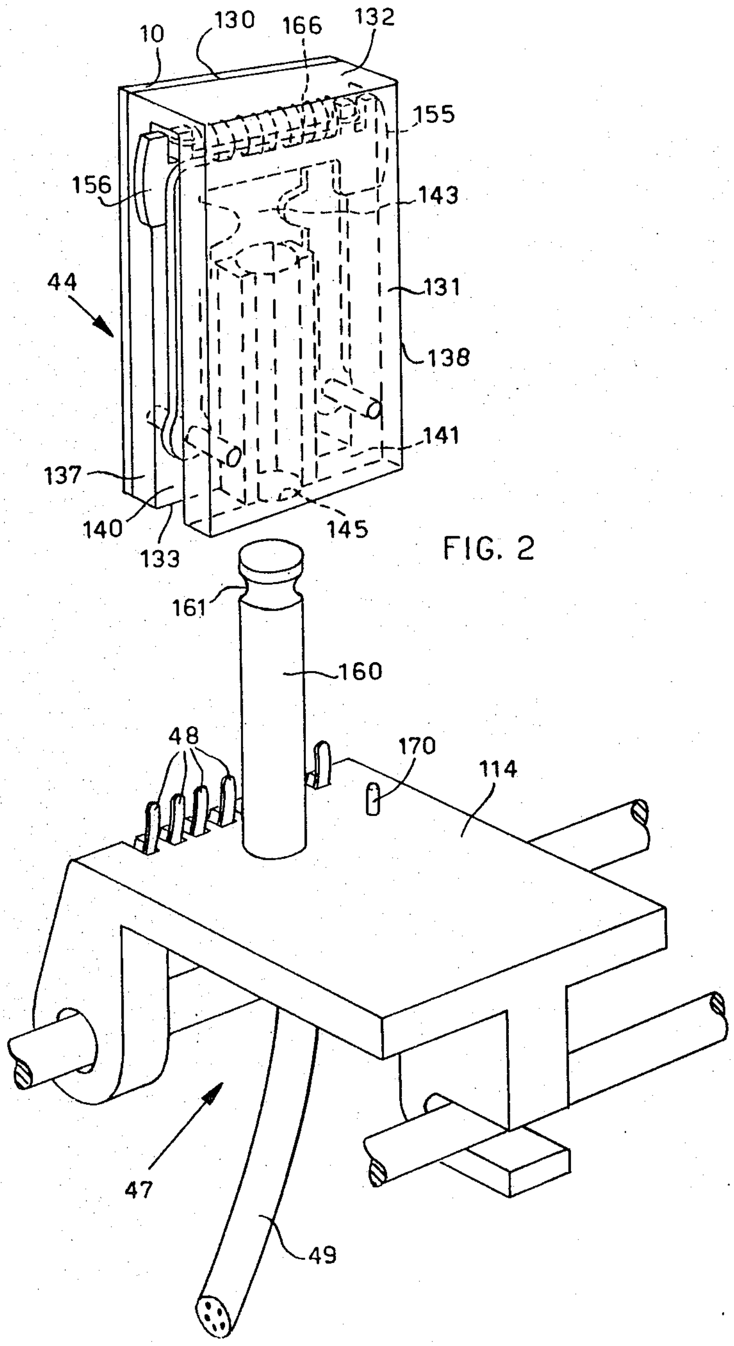
FIG. 2 is a perspective view of a second embodiment of the mechanism.
Figure 5:
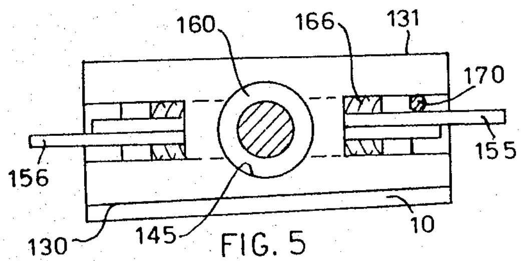
FIG. 5 is a cross-section V—V of the mechanism of FIG. 4.
Figure 3:
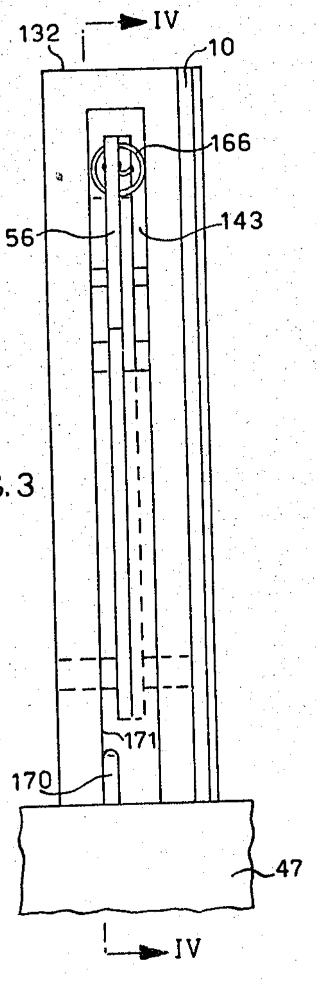
FIG. 3 is a side view of the mechanism of FIG. 2.
Figure 4:
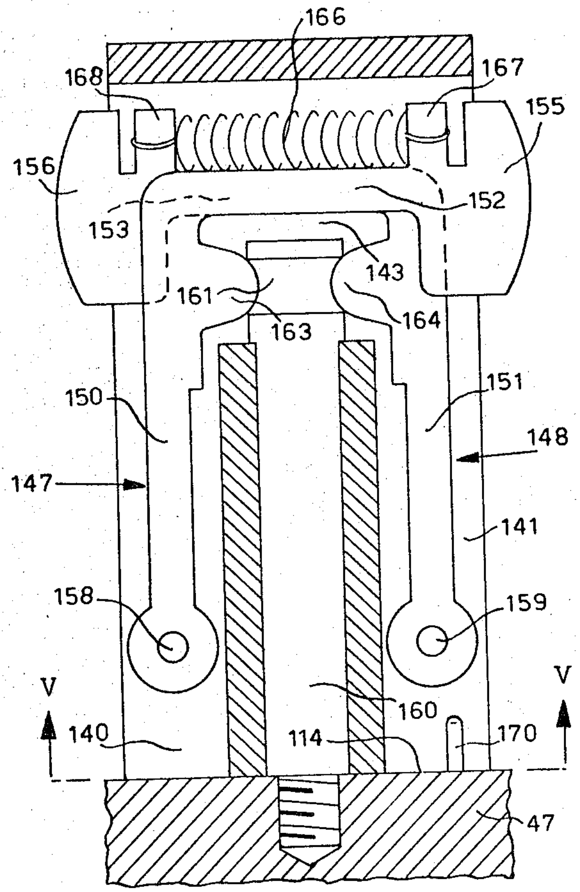
FIG. 4 is a cross-secton IV—IV of the mechanism of FIG. 3.

In FIG. 1 is shown, fixed on the surface 175 of a support block 44, a thermal print head 10 of the type described in U.S. Pat. application Ser. No. 512,564 and comprising a resistive strip-shaped zone 200 and a pattern of conductors 18 for selectively energizing part of said strip in the printing operation. The conductors 18 have thermal portions 201 regularly spaced on a side 178 of the print head 10.

The support block 44 is designed for being positioned on a base member 183 mounted on the carriage 47 slidably moved along the guides 205 and 206 for translating the head 10 along a printing line of the recording medium during the printing operations.

The extractable support block 44 further comprises two lateral sliding portions 176 and 177 extending along the support height, starting from its base 178, and a guiding groove 179 extending along the entire height of the support 44. Provided in the internal surface 180 of the groove 179 which is opposed to the surface 175, is a transverse groove 182 located in proximity of the lower base 178.

The carriage 47 comprises a flat portion 114 and in perpendicular relation thereto a base member 183 suitable to receive the head carrying support 44 and comprising two lateral guiding members 185 and 186 which are capable of sliding the lateral sliding members 176 and 177 of the support 44, and a central guiding member 189 suitable to engage the groove 179 of the support 44.

The central guiding member 189 comprises a surface 190 whereon is suitable to slide the internal surface 180 of the groove 179 and transversal projection 193 located at a height from the flat portion 114 which is equal to the distance between the groove 180 and the base 178 of the support 44, said projection 193 being suitable to engage the groove 182 when the insertion is executed.

The lateral sliding members 176 and 177 are provided with knurled portions 198 and 199 located in proximity of the support 44, which have the object of facilitating the normal taking of said support 44 in the insertion and extraction operation of the head carrying support 44 into and from the base member 183.

Secured to the flat portion 114 of the carriage 47 are furthermore eight resiliently flexible electrically conductive laminae 48 suitable to be brought into contact when the insertion is carried out, with the terminal portions 200 of the conductors 18 of the head 10, said laminae being connected to the control circuit not shown in the drawings specified by the cable 49.

The support 44 is placed onto the carriage 47 by bringing the sliding members 176 and 177 into engagement with the guiding members 185 and 186, and by keeping the plate carrying surface 175 of the support 44 so as to face the recording means; the support is to be displaced along the guiding members 185 and 186 so far as its lower base 178 bears against the flat portion 114 and consequently the groove 182 engages the projection 193, being pushed against it by the urging of the resiliently flexible electrically conductive laminae 48; the support 44 is thus prevented from accomplishing any further displacement along the guiding members 185 and 186.

The support 44 is extracted by simply taking its knurled portions 198 and 199 and by pulling it upwards by sufficient force so as to flex the laminae 48 and to disengage the projection 193 from the groove 182.

The FIGS. 2, 3, 4 and 5 show a second embodiment of the removably-mounting mechanism according to the invention; it differs from the previously described one in that the resilent elements locking the head carrying support 44 onto the carriage 47 are assembled on said support 44.

Reference is made to said figures; the support 44, having substantially a parallelepiped shape, comprises a first surface 130 whereto the head 10 is secured by sticking, a second surface 131 opposite to the surface 130 an upper base 132, a lower base 133 located in parallel relation to the base 132 and in perpendicular relation to the surface 131, and two flanks 138.

Provided in the two flanks 137 and 138, being symmetrically located with reference to a mean axis in perpendicular relation to the bases 132 and 133, are two equal grooves 140 and 141, respectively, extending, starting from the lower base 133 and in perpendicular relation thereto, along the height of the support 44. The grooves 140 and 141 are intercommunicating near the upper base 132 thus building up a substantially square hole going through from flank 137 to flank 138. A circular hole 145 located on the center of the lower base 133 of the support 44 extends inside the latter in perpendicular relation to the base 133, as far as the hole 143.

Two equal L-shaped levers 147 and 148 are provided with first arms 150 and 151 respectively, accomodated in the side grooves 140 and 141 respectively, and with second arms 152 and 153 respectively, symmetrically accomodated in the hole 143 in symmetric relation to the axis of the hole 145.

The free ends of the second arms 152 and 153 are constituted by expanded portions 155 and 156, respectively, projecting rom the hole 143 along the flanks 137 and 138, respectively.

The levers 147 and 148 are pivoted at the end portions of their first elements 150 and 151, respectively, on the pins 158 and 159, respectively, secured inside the grooves 140 and 141, respectively, with their axis being in perpendicular relation to the surface 131 of the support 44.

Secured to the flat portion 114 of the carriage 47 is a pin 160 being perpendicular with respect to said flat portion and suitable to be inserted into the hole 145 of the support 44 for locking the latter onto the carriage 47.

The pin 160 is provided with a groove 161 located near its free end.

Two projections 163 and 164 integral with the first arms 150 and 151, respectively, of the levers 147 and 148 respectively, are suitable to co-operate with the groove 161 of the pin 160 when the support 44 is placed on the carriage 47, owing to the urging of a spring 166 stretched between two lungs 167 and 168, bodily assembled to the second arms 152 and 153, respectively, of the levers 147 and 148, respectively.

A pin 170 is secured to the flat portion 114 of the carriage 47 and when the support 44 is placed thereon, it co-operates with the internal surface 171 of the groove 141.

The support 44 is placed on the carriage 47 by pushing contemporaneously the two expanded portions 155 and 156 projecting from the flanks 137 and 138, respectively, against the urging of the spring 166 thus causing the rotation of the two levers 147 and 148 in opposite direction and moving apart the two projections 163 and 164 for allowing the insertion of the pin 160; the support 44 is inserted onto the pin 160 by its hole 145, being the surface 130 of the support 44 facing the recording medium and is displaced as long as the base 133 comes into contact with the flat portion 114 of the carriage; subsequently, the two expanded portions 155 and 156 are released wherefore, owing to the urging of the spring 166, the two levers 147 and 148 are reset to their initial positions and the projections 163 and 164 engage the groove 161 of the pin 160 preventing the support from being displaced in the direction of the pin 160; in addition, the pin 170 co-operating with the internal wall 171 of the groove 140 prevents the support 44 from rotating about the pin 160.

When the insertion operation is carried out the flexible conductive laminae 48 ensure, as in the first embodiment, the electric connection between the thermo-elements borne by the head 10 and the controlling circuit.

The support 44 is extracted by pushing the two extended portions 155 and 156 so as to disengage the projections 163 and 164 from the groove 161 and then the support 44 may be pulled out from the pin 160.

The embodiments here specified have only an exemplary character and are by no means of limiting character on the removable mounting mechanism device according to the invention. Therefore, variations may be made to them without departing from the scope of the invention.

For example the hole 145 of the second embodiment may be provided in the carriage and the corresponding pin 160 bearing the groove 160 may be bodily assembled on the head. It becomes apparent that in this event the locking system made up of the levers 147 and 148 and the spring 166 should be assembled on the carrige.

In the same way, th projection 193 of the first embodiment may be provided in the head and the corresponding groove 182 may be provided in the carriage by obviously modifying the placing guiding members.

What we claim is:

1. In a non-impact printer of the type having a planar print head carrying on plane surface thereof a plurality of printing elements and a pattern of conductors for selectively effecting energization of said printing elements, a support member having a first planar surface upon which head is fixed and a base member upon which this support is mounted, the improvement comprising:

- guide means defining a rectilinear slide path along which said support member is slidably movable with respect to said base member between a free position and a working position wherein said print head is operable;
- means for releasably latching said support member in said working position comprising a first latch member disposed along said slide path and on said base member, a second latch member on said support member and cooperative with said first latch member when in a latching position to fix said support member along said slide path with respect to said base member;
- biasing means for biasing said second latch member into said latching position when said support member is moved into said working position; and
- means disposed on said base member for preventing any movement of said support in a direction perpendicular to the surface of said head and to the rectilinear guide path, whereby the head is fixed with respect to any pressure which is exerted onto the plane surface of the head during the printing operation.

2. In a non-impact printer according to claim 1, wherein said biasing means comprises a plurality of electrically conductive laminae resiliently mounted on said base member and contacting the conductors of said pattern when said support is in working position.

3. In a non-impact printer according to claim 1, wherein said means for preventing movement comprises:

- a second planar surface on said support member parallel and counterfacing said first surface;
- and a third planar surface on said base member, contacting said second planar surface when the support is in working position.

4. In a non-impact printer of the type having a thermal print head carrying on a plane surface a plurality of printing elements and a pattern of conductors for selectively effecting energization of said printing elements, a support member having a first planar surface upon which said head is fixed and a base member on said printer, the improvement comprising:

means for releasably fixedly mounting said support onto said base member into a working position wherein the print head is operable, said means comprising a pin disposed on said base member, a cylindrical hole on said support member slidably engageable along said pin for positioning said support in said working position, a groove on said pin, a pair of levers pivotally mounted on said support member, each having a latching element cooperative with said groove when in a latching position to prevent slidable movement of said support along said pin, a spring connected between said levers for urging each latching element into said latching position when said support is moved into said working position and manually operable means connected to each of said levers for moving said levers against the action of said spring to remove said latching element from said latching position; and means for preventing rotation of said support around said pin when latched, in the working position.

5. In a non-impact printing according to claim 4, wherein said rotation preventing means comprises a second pin on said base member, parallel to said first pin and a second planar surface of said support parallel to said first planar surface and contacting said pin when the support is in the working position.

6. In a non-impact printing according to claim 4, further comprising a plurality of electrically conductive laminae mounted on said base member for contacting the conductors of said pattern when said support is in its working position.

* * * * *